W. C. Robinson,
Churn.

No. 74,943.      Patented Feb. 25, 1868.

Witnesses                               Inventor
W. W. Seoys                             W. C. Robinson

United States Patent Office.

W. C. ROBINSON, OF SALTSBURG, PENNSYLVANIA.

Letters Patent No. 74,943, dated February 25, 1868.

IMPROVEMENT IN CHURNS.

*The Schedule referred to in these Letters Patent and making part of the same.*

TO ALL WHOM IT MAY CONCERN:

Be it known that I, W. C. ROBINSON, of Saltsburg, Indiana county, and State of Pennsylvania, have invented a new and useful Improvement in Churns; and I do hereby declare that the following is a full and exact description of the same, reference being had to the annexed drawings, and the letters of reference marked thereon, of which—

Figure 1:
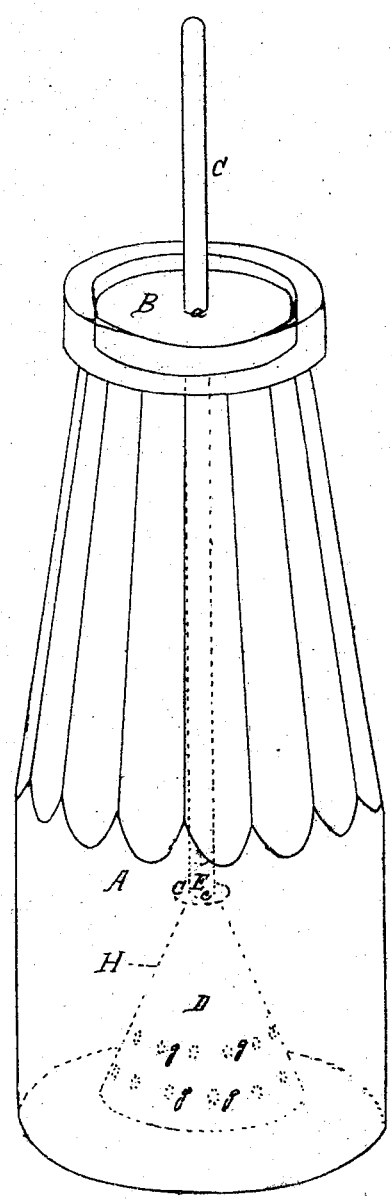
Figure 2:
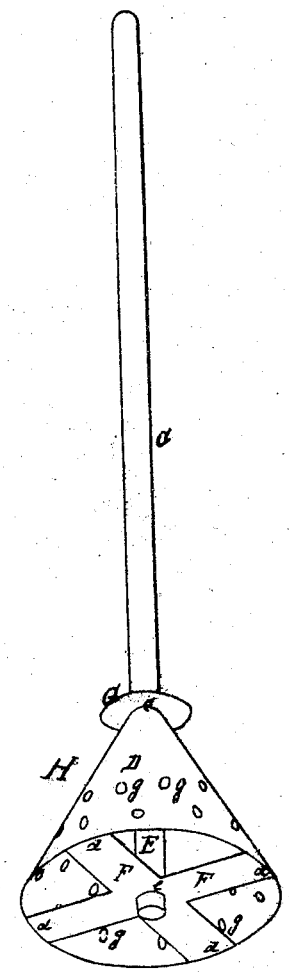

Figure 1 is a perspective view of the churn, and
Figure 2 a perspective view of the dasher and dash-staff.
Like letters refer to like parts in both drawings.

To enable those skilled in the art to make and use my invention, I will proceed to describe its construction and operation.

A is a vessel for holding the cream; B is a cap of the vessel, which is supprted by an annular projection on the inside of the vessel A, and is provided with a hole, $a$, sufficiently large for the dasher-staff C to work vertically, without friction. H is a dasher, composed of a hollow cone, D, with perforations $g\ g\ g\ g$, the frame F F, and the hollow cylinder E. The hollow perforated cone D is securely fastened to the cylinder E, at its upper extremity $c$, and at its lower extremity by the frame F F, which is attached to the periphery of the cone D at $d\ d\ d\ d$, and to the cylinder E at $e$, and the disk G is also secured to the cylinder E at $e$, and the whole firmly secured to the staff C, by the staff C passing through, and being immovably compressed by the cylinder E.

The operation of the churn is as follows: The vessel A is filled about two-thirds full of cream, the dasher D is inserted, and the cap B is placed on the annular projection on the inside of the vessel A, by first passing the staff C through the hole $a$, and lowering the cap B until it rests in the position described. In churning, sufficient motion should be given to the dasher D to raise it above the surface of the cream, so that the dasher D may be filled with air, which, in descending through the cream, is forced out through the perforations $g\ g\ g\ g$, and escapes to the surface, thus, with the agitation of the cream produced by the dasher D and cross-frame F F, causing the best facilities for churning with rapidity and efficiency. When the churning is finished, all the particles of butter rise to the surface of the cream, and are gathered into rolls or masses by gently tapping the cream on the surface with the dasher H, when the butter is collected. By raising the staff C, the disk G comes in contact and removes the cap B, when rolls or masses may be taken out to be worked.

The churn may be cleaned by simply emptying the cream out of the vessel A, and substituting water, and replacing the dasher D, and the cap B, and churning as before.

The simplicity of the construction of this churn, and the efficiency and rapidity with which it operates, confidently recommend it to the public.

Having thus described the construction and operation of my invention, what I claim as new, and desire to secure by Letters Patent, is—

The dasher H, composed of the perforated hollow cone D, the frame F F, the cylinder E, and the disk G, as and for the purpose specified.

W. C. ROBINSON.

Witnesses:
W. H. LYONS,
R. M. ROBINSON.